Oct. 20, 1953    J. B. DURHAM    2,655,720
BRAKE ANCHOR TOOL
Filed Sept. 26, 1949

Inventor
James B. Durham

By *Clarence A. O'Brien and Harvey B. Jacobson*
Attorneys

Patented Oct. 20, 1953

2,655,720

UNITED STATES PATENT OFFICE 2,655,720

BRAKE ANCHOR TOOL

James B. Durham, Fort Payne, Ala.

Application September 26, 1949, Serial No. 117,820

1 Claim. (Cl. 29—229)

This invention comprises novel and useful improvements in a brake anchor tool and more specifically pertains to a tool specifically adapted to facilitate the removal of the horseshoe-shaped spring washer for retaining a brake anchor pin from its seated position in the annular groove of such pin.

The principal object of this invention is to provide a simple and inexpensive construction of tool which is specifically adapted for use in removing a horseshoe-shaped anchor pin washer from its resilient locking and seating engagement in the annular groove in an anchor pin such as the anchor pin of brake shoe assemblies of automotive vehicles.

A further object of the invention is to provide a tool which shall have a secure seating engagement with the ends of the horseshoe throughout the entire operation of removing the same from its locking groove.

A still further object of the invention is to provide a specialized tool as set forth hereinbefore wherein the tool is provided with portions adapted to securely engage the ends of a horseshoe type of anchor pin washer, is adapted to enter the locking groove of an anchor pin, and wherein relative movement between the two portions of the tool during the removing operation is effected.

These, together with various ancillary features and objects of the invention which will later become apparent as the following description proceeds, are attained by the present invention, a preferred embodiment of which has been illustrated by way of example only in the accompanying drawings, wherein.

Figure 1:
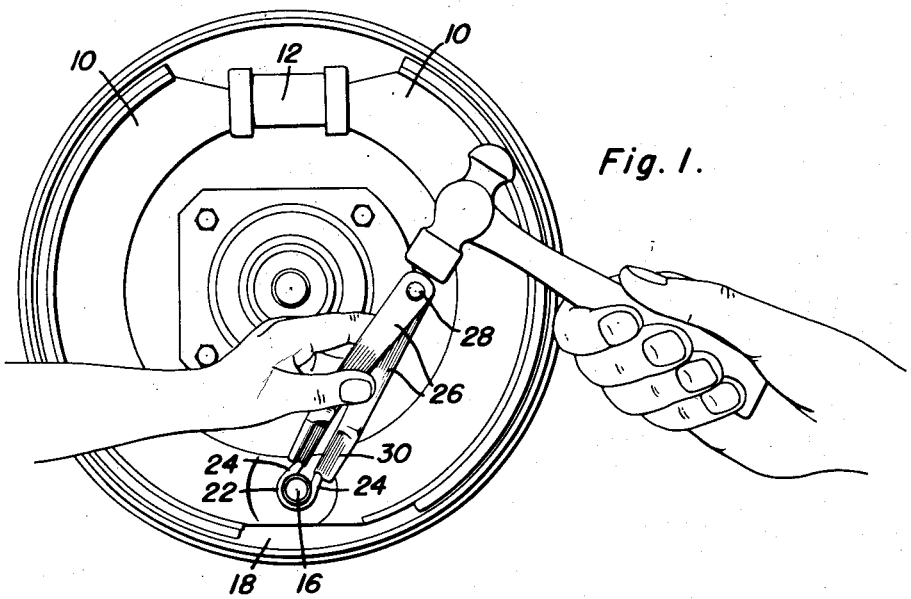
Figure 1 is a side elevational view showing the manner of employing the tool to remove the locking washer of a brake anchor pin.

Referring now more specifically to the accompanying drawings, wherein like numerals designate similar parts throughout the various views, attention is directed first to Figure 1 wherein it will be seen that the tool is shown applied to a conventional automobile brake assembly including a pair of brake shoes 10 having a hydraulic operating cylinder 12 for expanding these shoes, the shoes being fulcrumed upon and secured to a brake anchor pin 16, about which the shoes have a pivoting or arcuate movement during their operation. In constructions of this type, the anchor pin 16 extending through the brake retaining plate 18 and through adjacent ends of the brake shoes 10 is provided with a locking groove 20, a horseshoe-shaped locking washer 22 being provided with legs 24 which are adapted to be received in the groove 20 and resiliently embrace the same, to thereby prevent withdrawal of the brake shoes from their engagement with the anchor pin and the brake shoe carrier plate 18.

Figure 2:
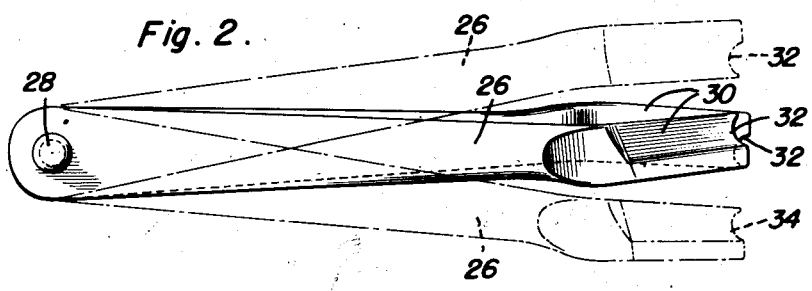
Figure 2 is a side elevational view of the tool, the latter being shown in full lines in its closed position, and in dotted lines in its open position.
Figure 3:
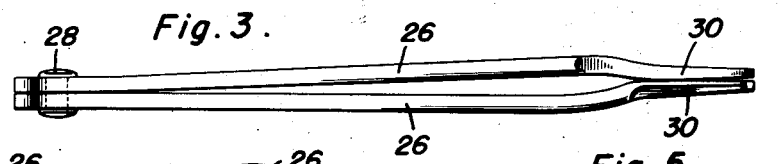
Figure 3 is an end elevational view of the device of Figure 2.
Figure 5:
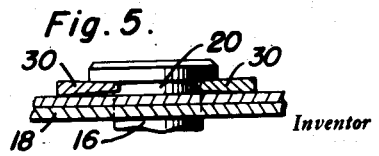
Figure 5 is a fragmentary transverse sectional detail view taken substantially upon the plane of the section line 5—5 of Figure 4.

In view of the necessarily tightly fitting resilient engagement of the arms 24 of the locking washer 22 in the groove 20, it is evident that considerable force is necessary in order to force the locking washer from the groove in order that the anchor pin 16 may be withdrawn to permit removal of the brake shoes 10 from the brake shoe carrier plate 18. Moreover, since in brake shoe constructions of this nature there is usually very little room in which to obtain access to the parts in order to permit the withdrawal of the brake pin washer from the locking groove of the anchor pin, considerable difficulty and loss of time are required in order to effect such withdrawal The tool of the present invention is specifically adapted to operate in such an environment for conveniently effecting a removal of the brake anchor pin washer from the brake anchor pin locking groove. This tool conveniently comprises a pair of elongated members 26 which may be formed of light weight metal or the like and constitute legs which are terminally pivoted to each other as by a rivet or other pivot pin 28. By this means, the legs can readily be spread from the closed, full-line position shown in Figure 2 to the dotted line position shown therein. At their opposite ends, the legs 26 which are bowed slightly outwardly from each other as shown in Figure 3 are directed inwardly toward each other and are provided with extremities which have flattened leg-like terminals 30 of sufficient thinness to be received within the groove 20 as shown in Figure 5. Upon their ends, the terminal blades of the legs are provided with recesses or sockets 32 disposed adjacent the inside edges of the legs, these sockets constituting seats in which are received the portions 24 of the washer 22. These seats are deep enough so as to snugly retain the ends 24 of the washers during removal of the washers from the locking groove.

Figure 4:
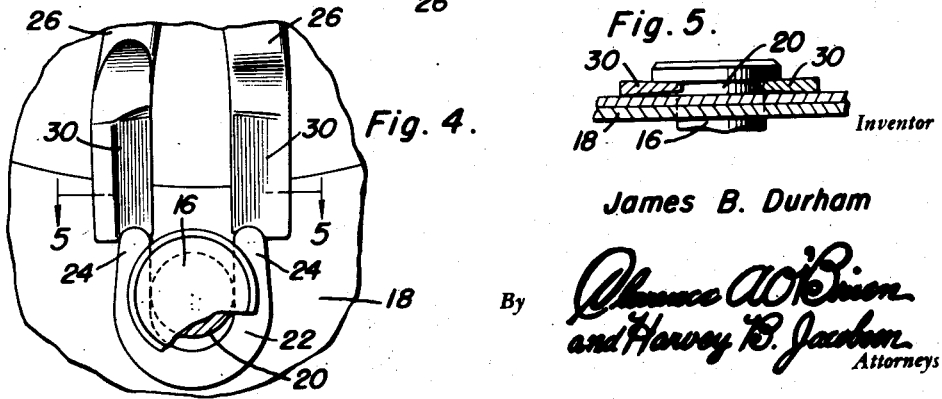
Figure 4 is an enlarged fragmentary elevational view showing the locking pin engaging portion of the tool in operative position for removing a brake anchor pin washer.

From the foregoing, the operation of the device will now be understood. The legs of the tool are spread apart sufficiently to enable the user to place the seats 32 upon the ends 24 of the locking washer, as shown in Figures 1 and 4. The pivoted end of the tool may then be struck with a hammer, and the tool together with the locking washer will then be driven in a direction which will cause the withdrawal of the legs 24 of the washer from the locking groove 20. As the edges of the legs of the tool enter the locking groove 20, the inner edges of the tool will rest against the inner wall of the locking groove, whereupon the legs will be spread further apart, this being permitted by the pivoting movement of the legs about their pivot pin 28. Since the ends 24 of the washer are firmly seated in the seat or recesses 32, the legs 24 of the washer will be thus spread slightly further apart, this permitting easy removal of the washer from the locking groove.

From the foregoing, the construction and operation of the invention will be readily understood, and further explanation is believed to be unnecessary. However, since numerous modifications and equivalents will readily occur to those skilled in the art after a consideration of the foregoing specification and accompanying drawings, it is not desired to limit the invention to the exact construction shown and described, but all suitable modifications and equivalents may be resorted to, falling within the scope of the accompanying claim.

Having thus disclosed and described the invention, what is claimed as new is as follows:

A brake anchor pin washer removing tool comprising a pair of flat elongated legs, first ends of said legs being in overlying relation and pivotally connected together, the other ends of said legs being free for movement with respect to each other, inner edge portions of said other ends being convergingly tapered towards their free edges and of reduced thickness to facilitate engagement within a washer receiving groove of a brake anchor pin, free ends of said inner edge portions being provided with recessed seats for receiving free ends of a brake anchor pin washer, said legs being oppositely bowed intermediate their ends to align said inner edge portions in a common plane, said legs being adapted to impart downwardly and outwardly directed thrusts on the free ends of a brake anchor pin washer in response to downward driving of the tool.

JAMES B. DURHAM.

References Cited in the file of this patent

UNITED STATES PATENTS

| Number | Name | Date |
|---|---|---|
| 1,449,763 | Knapp | Mar. 27, 1923 |
| 1,641,754 | Glover | Sept. 6, 1927 |
| 1,964,468 | Irvine | June 26, 1934 |
| 2,272,355 | Schnell | Feb. 10, 1942 |
| 2,438,174 | Laing | Mar. 23, 1948 |
| 2,508,555 | Whitney | May 23, 1950 |